Patented Nov. 22, 1949

2,489,103

UNITED STATES PATENT OFFICE 2,489,103

ESTERS OF 5-OXY-1,2 CARBOXY CYCLOHEXANES

Rupert C. Morris and Robert M. Horowitz, Berkeley, Calif., assignors to Shell Development Company, San Francisco, Calif., a corporation of Delaware No Drawing. Application August 13, 1945, Serial No. 610,674

8 Claims. (Cl. 260—468)

This invention relates to ethers of substituted cyclohexanedicarboxylic acid esters. More particularly, the invention pertains to ethers of 3,5-dialkylhexahydrophthalic acid diesters and their production by the reaction of 3,5-dialkyl-$\Delta^4$-tetrahydrophthalic anhydrides with hydroxy organic compounds in the presence of a strong acid esterification catalyst. A preferred embodiment of the invention comprises the unsaturated ethers of the unsaturated diesters of 3,5-dialkyl-1,2-cyclohexanedicarboxylic acids and their preparation by the reaction of 3,5-dialkyl-$\Delta^4$-tetrahydrophthalic anhydride with an unsaturated alcohol in the presence of a strong mineral acid.

The novel compounds of the invention comprise the 3,5-dialkyl-1,2-cyclohexanedicarboxylic acid diesters wherein the nuclear carbon atom in position number 5 is directly attached to an oxygen atom which is linked directly to an organic radical. For example, methyl alcohol reacted with 3,5-dimethyl-$\Delta^4$-tetrahydrophthalic anhydride according to the process of the invention produces the dimethyl ester of 3,5-dimethyl-5-methoxy-1,2-cyclohexanedicarboxylic acid, ethyl alcohol reacted with 3,5-dipropyl-$\Delta^4$-tetrahydrophthalic anhydride results in the formation of the diethyl ester of 3,5-dipropyl-5-ethoxy-1,2-cyclohexanedicarboxylic acid, etc.

The diesters of 3,5-diaylkyl-1,2-cyclohexanedicarboxylic acids wherein the 5-position has been etherified provide a group of novel and useful compounds possessing valuable properties for a variety of purposes. The ether-diesters serve as intermediates for use in the plastic, textile, dye and related industries, and find utility as solvents and diluents for various applications. Moreover, the novel ethers of the diesters of 3,5-dialkyl-1,2-cyclohexanedicarboxylic acids of the invention have been found to posses valuable properties as plasticizers or softening agents for a wide variety of natural or synthetic rubbers, resins and plastics. The novel compounds are particularly valuable as plasticizers because of their wide range of compatibility and their resistance to deterioration and evaporation, and because they aid in the formation of plastics very light in color. The ether-diesters may also serve as perfume fixatives and as insecticides, parasiticides and fungicides or as ingredients of insecticidal, parasiticidal and fungicidal compositions.

The esters of the 3,5-dialkyl-1,2-cyclohexanedicarboxylic acids wherein the carbon atom in the 5-position is directly attached to an organic oxy radical may be hydrolyzed to produce the corresponding 3,5-dialkyl-1,2-cyclohexanedicarboxylic acid wherein the carbon atom in the 5-position is directly attached to an organic oxy radical. These ether-dicarboxylic acids are useful as plasticizers, insecticides, and as ingredients for use in the plastic, resin, rubber, textile, dye and related industries.

Particularly valuable ether-diesters are the unsaturated ethers of the diesters obtained, for example, by reacting the 3,5-dialkyl-$\Delta^4$-tetrahydrophthalic anhydride with a monohydroxy unsaturated alcohol, and more particularly a beta-gamma-unsaturated alcohol which contains an unsaturated linkage between two carbon atoms of aliphatic character one of which is directly attached to the carbinol carbon atom. These particularly valuable novel compounds comprise the unsaturated diesters of the 3,5-dialkyl-1,2-cyclohexanedicarboxylic acids wherein the carbon atom in the 5-position is linked directly to an oxygen atom which is directly attached to an unsaturated hydrocarbon radical, said unsaturated radicals preferably having the unsaturation in the beta-gamma-position. The unsaturated ether-diesters may be represented by the general formula

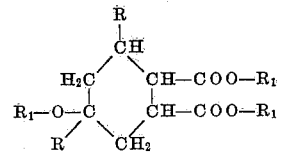

wherein R is any alkyl radical, and $R_1$ is an unsaturated hydrocarbon radical. The unsaturated hydrocarbon radicals which $R_1$ represents may be the same or different and are preferably beta-gamma-unsaturated hydrocarbon radicals such as allyl, methallyl, crotyl, tiglyl, cinnamyl, furfuryl, ethallyl, 2-hexenyl, 2-methyl-3-ethylallyl, 2-ethyl-3-propylallyl, methylvinylcarbinyl, chloroallyl, ethylvinylcarbinyl, 1-hexen-3-yl, 3-methyl-1-buten-3-yl, 3-methyl-1-penten-3-yl, 2-methyl-1-buten-3-yl, 2-methyl-1-penten-3-yl, 2,3-dimethyl-1-buten-3-yl, 1-hepten-3-yl, 4-methyl-1-hexen-3-yl, 5-methyl-1-hexen-3-yl, 4,4'-dimethyl-1-penten-3-yl, 1-octen-3-yl, 6-methyl-1-hepten-3-yl, 4-methyl-1-hepten-3-yl, 4,4'-dimethyl-1-hexen-3-yl, 3-phenyl-1-propen-3-yl, 3-tolyl-1-propen-3-yl, 3-xylyl-1-propen-3-yl, 4-phenyl-1-buten-3-yl, 4-tolyl-1-buten-3-yl, 4-xylyl-1-buten-3-yl, 3-naphthyl-1-propen-3-yl, 4-chloro-1-buten-3-yl, 1,4-pentadiene-3-yl, 1-hexen-5-yn-3-yl, 2-methyl-1-penten-4-yn-3-yl, 2,5-dimethyl-1,5-hexadien-4-yl, 2-cyclopenten-1-yl, 2-cyclohexen-1-yl, and the like and their homologues and analogues. These unsaturated ether-diesters of 3,5-dialkyl-1,2-cyclohexane-dicarboxylic acids are particularly valuable because they possess polymer- and copolymer-forming properties. They also form stable plasticizers which possess comparatively high boiling points and are desirable because they show very little loss due to volatility. They aid in the formation of clear polymers which are light in color, possess film-forming properties and adhere well to metals and many other kinds of surfaces, so they may be used as the bases for valuable coating compositions.

A single unsaturated ether-diester of a 3,5-dialkyl-1,2-cyclohexanedicarboxylic acid can be polymerized alone, or two or more such unsaturated ether-diesters can be polymerized in admixture with each other. The compounds can be polymerized in the presence of other polymerizable compounds, particularly those containing one or more unsaturated carbon-to-carbon linkages. Typical copolymerizable compounds are those containing in the molecule a single polymerizable olefinic linkage, such as styrene, vinyl halides, vinylidene halides, vinyl esters of saturated monocarboxylic acids, methyl acrylate, methyl methacrylate, allyl halides, allyl esters of saturated monocarboxylic acids, etc. Another important group consists of unconjugated polymerizable compounds having in the molecule two or more non-conjugated polymerizable unsaturated linkages such as unsaturated aliphatic polyesters of saturated polybasic acids, polyesters of saturated polyhydric alcohols with unsaturated organic acids, and esters of unsaturated alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon, boron, etc. Another important group of copolymerizable compounds consists of those having in the molecule two or more, preferably two, conjugated unsaturated polymerizable carbon-to-carbon linkages such as conjugated butadiene, conjugated chlorobutadiene, isoprene, the other conjugated pentadienes, the conjugated hexadienes, their homologues, analogues and suitable substitution products. Particularly valuable copolymers are those of the compounds of the invention with one or more allyl-type polyesters of polycarboxylic acids, particularly allyl-type polyesters of aromatic polycarboxylic acids, e. g. diallyl phthalate and the like. Other valuable copolymers of the preferred class are those with allyl-type polyesters of ethereal oxygen-containing polycarboxylic acids, e. g. diallyl diglycolate.

The compounds of the invention can be polymerized and copolymerized by oxygen-containing polymerization catalysts. Benzoyl peroxide is satisfactory for this purpose. Other polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxides, such as tertiary butyl hydroperoxide, peracetic acid, perphthalic acid, sodium peroxide, perborates, persulfates, ozone and oxygen. The compounds can be polymerized in the presence of their own peroxides, or of their ozonides. Another class of polymerization catalysts consists of the di(tertiary alkyl) peroxides, notably di(tertiary butyl) peroxide, as described and claimed in the copending application of Vaughan and Rust, Serial Number 481,052, filed March 29, 1943, now Patent No. 2,426,476, which is a continuation-in-part of their copending application Serial Number 474,224, filed January 30, 1943, now Patent No. 2,395,523. Metals and metallic salts may be uesd as polymerization catalysts. If desired, mixtures of polymerization catalysts can be used, and in some cases it may be desirable to conduct the polymerization in the concurrent presence of both a catalyst and an inhibitor of polymerization. In still other cases it may be unnecessary to use any catalyst at all.

Polymers and copolymers of the compounds of the invention can be modified by admixture with other synthetic resins, natural resins, cellulose derivatives, and drying oils. Preferred modifiers are film-forming substances. Examples of synthetic resins in addition to polymers of the polymerizable unsaturated organic compounds illustrated hereinabove are alkyd resins, urea-aldehyde resins, phenol-aldehyde resins and synthetic linear super-polyamides and polyester-amides. There may also be present one or more plasticizers, stabilizers, lubricants, dyes, pigments, or fillers. Where the modifiers do not react with, or otherwise adversely affect the ingredients of the reaction mixture, they may be added to the monomer or to the partially polymerized material.

The novel diesters of the 3,5-dialkyl-1,2-cyclohexanedicarboxylic acids wherein the carbon atom in the 5-position is linked directly to the oxy-oxygen atom of an organic oxy radical, may be prepared by a variety of suitable methods. For example, the desired ether-diester may be prepared by a two-stage process by first preparing the diester of a 3,5-dialkyl-$\Delta^4$-tetrahydrophthalic acid and then reacting the diester with an organic hydroxy compound in the presence of a suitable catalyst to form the ether-diester. A particularly suitable method for the preparation of the ether-diester comprises reacting a 3,5-dialkyl-$\Delta^4$-tetrahydrophthalic acid or the corresponding anhydride with an organic hydroxy compound in the presence of a suitable catalyst and under such conditions that the ether-diester is formed in a one-step process.

The one-step process may be effected by reacting the hydroxy compound or compounds with a 3,5-dialkyl-$\Delta^4$-tetrahydrophthalic anhydride in the presence of a strongly acidic esterification catalyst. Particularly suitable esterification catalysts include the strong mineral acids such as $H_2SO_4$, $H_3PO_4$, $H_2S_2O_7$, $HPO_3$, $HCl$, $HBr$, $H_4P_2O_7$, $HClO_3$, $HClO_4$, $HNO_3$, and the like. Mineral acid constituents may also be utilized such as $SO_2Cl_2$, $SOCl_2$, $SOBr_2$, $NO_2$, $N_2O_3$, $NOCl$, $POCl_3$, $PCl_3$, $PCl_5$ and the like. Suitable inorganic strongly acid-acting salts may also be employed.

The 3,5-dialkyl-$\Delta^4$-tetrahydrophthalic anhydride and the organic hydroxy compound may be reacted in any convenient proportions, but the organic hydroxy compound is preferably in excess over the anhydride. It has been found effective to effect the one-step reaction with at least about three equivalents, and preferably about four to six equivalents, of the hydroxy compound present for each mole of the anhydride. The reaction may be carried out in any suitable type apparatus, preferably at an elevated pressure, and at any convenient pressure which may be atmospheric, superatmospheric or below atmospheric. The temperature is preferably at least high enough to bring the reactants to a reflux temperature, but should be kept below that temperature at which substantial decomposition of the reactants and/or products takes place. If desired, the reaction may take place in the presence of a solvent or diluent which is substantially inert to the reactants and/or products, and which is present in amounts sufficient to bring about solution of at least portions of the reactants and/or products, but not enough to cause excessive dilution or in any other way to interfere with the reaction.

The hydroxy compound which is to be reacted according to the process of the invention is an organic compound which contains one or more esterifiable hydroxy radicals and may be saturated or unsaturated, cyclic, acyclic or aromatic. Suitable hydroxy organic compounds include those compounds wherein one or more hydroxy radicals are directly attached to an alkyl, alkenyl, aryl, alkaryl, alkenaryl, aralkenyl, aralkyl, cycloalkyl and/or cycloalkenyl radical, or their corresponding substituted derivatives wherein the substituents are substantially inert under the conditions of the reaction and will not split off or react or otherwise interfere with the course of the reaction, e. g. the halogen-substituted derivatives. Examples of suitable hydroxy organic compounds are methyl alcohol, ethyl alcohol, propyl alcohol, isopropyl alcohol, butyl alcohol, isopropyl carbinol, 2-butanol, tertiary butyl alcohol, pentanol, cyclopentanol, cyclohexanol, vinyl alcohol, allyl alcohol, butenol, phenol, benzyl alcohol, xylenol, methyl cyclohexyl carbinol, 3,3,5-trimethylcyclohexanol, cyclohexenol, isophorol, catechol, ethylene glycol, propylene glycol, butan-1,3-diol, glycerol, propargyl alcohol, chloromethanol, trichloro tertiary butyl alcohol, monoallyl ether of ethylene glycol, the monoallyl ether of diethylene glycol, and the like and their homologues and analogues. The hydroxy compounds may be applied singly or in mixtures with one or more different alcohols.

The 3,5-dialkyl-$\Delta^4$-tetrahydrophthalic anhydrides may be readily prepared by a Diels-Alder reaction, using as starting materials a 1,3-dialkylbutadiene-1,3 and maleic anhydride. A mixture of approximately equimolecular proportions of maleic anhydride and the conjugated diene are heated at a temperature which is sufficiently elevated to effect the addition reaction of the two compounds, thereby forming the desired 3,5-dialkyl-$\Delta^4$-tetrahydrophthalic anhydride. The reaction may be carried out, if desired, in the presence of a suitable solvent such as an aromatic hydrocarbon, e. g. benzene. The adduct may be separated from the reaction mixture by any desired means, as by fractional distillation under diminished pressure. It is usually preferred, however, to effect its separation by allowing the product to crystallize from the reaction mixture. The reaction temperature is variable depending upon the character of the starting materials and upon the other conditions of reaction, but may in general be between about 0° C. and about 200° C., preferably about 50° C. to about 100° C. Somewhat higher temperatures may be employed, if desirable, however, particularly when the reaction is carried out at a superatmospheric pressure.

When it is desired to prepare the ether-diesters of the 3,5-dialkyl-1,2-cyclohexanedicarboxylic acids by a two-stage process involving the preparation first of the diester of the 3,5-dialkyl-$\Delta^4$-tetrahydrophthalic acid and the subsequent reaction of the diester with an organic hydroxy compound in the presence of a suitable catalyst to produce the ether-diester, the diester of the 3,5-dialkyl-$\Delta^4$-tetrahydrophthalic acid may be prepared by heating the 3,5-dialkyl-$\Delta^4$-tetrahydrophthalic anhydride or the corresponding free acid with an organic hydroxy compound in the presence of a comparatively weak acidic esterification catalyst, e. g. benzenesulfonic acid, p-toluenesulfonic acid and the like according to the process described in copending application, Serial Number 554,860, filed September 19, 1944, now Patent No. 2,445,627. The diester is then reacted with the organic hydroxy compound in the presence of a strong acidic esterification catalyst, e. g. sulfuric acid to form the ether-diester.

Included within the scope of the invention are the mixed ether-diesters which may be produced by a variety of suitable methods, for example by reacting a diester of a 3,5-dialkyl-$\Delta^4$-tetrahydrophthalic acid with an alcohol having the hydroxy group or groups attached to an organic radical different from the ester radicals. For example: diethyl 3,5-dimethyl-5-allyloxy-1,2-cyclohexanedicarboxylate is prepared by reacting diethyl 3,5-dimethyl-$\Delta^4$-tetrahydrophthalate with allyl alcohol in the presence of e. g. concentrated sulfuric acid; dimethallyl 3,5-diethyl-5-allyloxy-1,2-cyclohexanedicarboxylate is prepared by reacting dimethallyl 3,5-diethyl-$\Delta^4$-tetrahydrophthalate with allyl alcohol; dicrotyl 3-methyl-5-isopropyl - 5 - phenoxy - 1,2 - cyclohexanedicarboxylate is produced by reacting dicrotyl 3-methyl-5-isopropyl-$\Delta^4$-tetrahydrophthalate with phenol; and so forth.

The following examples serve to illustrate the invention.

Example I

A mixture of about 805 grams of 3,5-dimethyl-$\Delta^4$ - tetrahydrophthalic anhydride, about 788 grams of allyl alcohol, about 4 grams of p-toluenesulfonic acid and approximately 200 cc. of benzene was refluxed, removing water as it was formed. About 284 grams of the diallyl 3,5-dimethyl-$\Delta^4$-tetrahydrophthalate thus obtained is refluxed with about 13 grams of concentrated sulfuric acid and approximately 232 grams of allyl alcohol to obtain a good yield of diallyl 3,5-dimethyl - 5 - allyloxy - 1,2 - cyclohexane - dicarboxylate.

Example II

About 233 parts by weight of dimethyl 3,5-dimethyl-$\Delta^4$-tetrahydrophthalate, prepared by refluxing 3,5-dimethyl-$\Delta^4$-tetrahydrophthalic anhydride and methyl alcohol in the presence of p-toluenesulfonic acid were refluxed with about 13 parts by weight of concentrated sulfuric acid and approximately 130 parts by weight of methanol. During the refluxing, the temperature rose from 70° C. to 72° C. Approximately 84 parts by weight of methyl 3,5-dimethyl-5-methoxy-1,2-cyclohexanedicarboxylate was obtained after neutralization and fractionation. This ether containing ester has a boiling point of 88° C. to 93° C. at 0.2 mm.

Upon saponification, there was obtained 3,5-dimethyl-5-methoxy-1,2-cyclohexanedicarboxylic acid having a melting point of 174° C. to 175° C.

Example III

A mixture of approximately 276 parts by weight of 3,5-dimethyl-Δ⁴-tetrahydrophthalic anydride with about 276 part by weight of ethanol was refluxed in the presence of about 2 parts by weight of concentrated sulfuric acid and with benzene and petroleum ether present. Upon distillation, diethyl 3,5-dimethyl-5-ethoxy-1,2-cyclohexane-dicarboxylate was recovered. The ether containing ester was then hydrolyzed to produce 3,5-dimethyl - 5-ethoxy-1,2-cyclohexanedicarboxylic acid having a melting point of 184° C. to 186° C.

*Example IV*

Following the procedure of Example II, diallyl 3,5-diethyl - 5 - allyloxy - 1,2 - cyclohexanedicarboxylate is prepared by reacting 3,5-diethyl-Δ⁴-tetrahydrophthalic anhydride with allyl alcohol.

*Example V*

Dicrotyl 3,5-diisobutyl-5-crotyloxy-1,2-cyclohexanedicarboxylate is prepared by refluxing 3,5-diisobutyl-Δ⁴-tetrahydrophthalic anhydride with crotyl alcohol in about a 1:5 molar ratio in the presence of concentrated sulfuric acid.

*Example VI*

When chloroallyl alcohol and 3,5-dimethyl-Δ⁴-tetrahydrophthalic anhydride are refluxed in the presence of concentrated sulfuric acid according to the procedure described in Example III, di(chloroallyl) 3,5 - dimethyl - 5-chloroallyloxy-1,2,-cyclohexanedicarboxylate is obtained in good yield.

*Example VII*

Dimethallyl 3,5-dimethyl-5-allyloxy-1,2-cyclohexanedicarboxylate is prepared by reacting methallyl alcohol and 3,5-dimethyl-Δ⁴-tetrahydrophthalic anhydride in the presence of p-toluenesulfonic acid, and refluxing the resultant dimethallyl 3,5-dimethyl-Δ⁴-tetrahydrophthalate with allyl alcohol in the presence of concentrated sulfuric acid according to the procedure described in Example II.

*Example VIII*

Diallyl 3,5-dimethyl-5-allyloxy-1,2-cyclohexanedicarboxylate obtained in accordance with the procedure outlined in Example I is mixed with about 5 parts of benzoyl peroxide per 100 parts of the ester, and the mixture is maintained at a temperature of about 60° C. to about 70° C. for several hours in a sealed vessel with subsequent recovery of the polymer.

*Example IX*

A mixture of diallyl 3,5-dimethyl-5-allyloxy-1,2-cyclohexanedicarboxylate, 8 parts, with diallyl phthalate, 92 parts, and benzoyl peroxide, 2 parts, is heated in a sealed glass vessel at approximately 65° C. and the resulting copolymer is recovered.

We claim as our invention:

1. A compound of the general formula

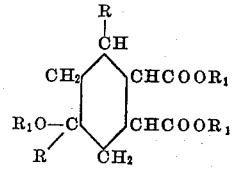

in which R represents an alkyl radical of from 1 to 4 carbon atoms and R₁ represents an aliphatic radical, containing from 1 to 6 carbon atoms, of the group consisting of the 2-alkenyl, chloro-2-alkenyl and alkyl radicals.

2. A di-2-methylidenealkyl 3,5-dimethyl-5-(2 - methylidenealkoxy) - 1,2-cyclohexanedicarboxylate in which the 2-methylidenealkyl radicals contain from 2 to 4 carbon atoms.

3. A di-2-alkenyl 3,5-diethyl-5-(2-alkenyloxy)-1,2-cyclohexanedicarboxylate in which the 2-alkenyl radicals contain from 2 to 4 carbon atoms.

4. A di-2-alkenyl 3,5-dimethyl-5-alkenyloxy-1,2 - cyclohexanedicarboxylate in which the alkenyl radicals contain from 2 to 4 carbon atoms.

5. A di-2-alkenyl 3,5-dialkyl-5-(2-alkenyloxy) - 1,2-cyclohexanedicarboxylate in which the alkyl radical contains from 1 to 4 carbon atoms and the 2-alkenyl radical contains from 2 to 4 carbon atoms.

6. Diallyl 3,5-dimethyl-5-allyloxy-1,2-cyclohexanedicarboxylate.

7. Dimethyl 3,5-dimethyl-5-methoxy-1,2-cyclohexanedicarboxylate.

8. Dimethallyl 3,5-dimethyl-5-allyloxy-1,2-cyclohexanedicarboxylate.

RUPERT C. MORRIS.
ROBERT M. HOROWITZ.

REFERENCES CITED

The following references are of record in the file of this patent:

UNITED STATES PATENTS

| Number | Name | Date |
|---|---|---|
| 2,159,008 | Coleman et al. | May 23, 1939 |
| 2,218,439 | Rothrock | Oct. 15, 1940 |
| 2,275,034 | Moyle | Mar. 3, 1942 |
| 2,346,612 | Rothrock | Apr. 11, 1944 |
| 2,384,855 | Soday | Sept. 18, 1945 |
| 2,407,673 | Milas | Sept. 17, 1946 |